United States Patent [19]

Shimada

[11] Patent Number: 5,185,792
[45] Date of Patent: Feb. 9, 1993

[54] RECORDING AND REPRODUCING APPARATUS WITH LIMITED DIGITAL COPYING

[75] Inventor: Hiromichi Shimada, Amagasaki, Japan

[73] Assignee: Matsushita Electric Industrial Co., Ltd., Osaka, Japan

[21] Appl. No.: 762,986

[22] Filed: Sep. 20, 1991

Related U.S. Application Data

[62] Division of Ser. No. 633,898, Dec. 26, 1990, which is a division of Ser. No. 307,446, Feb. 8, 1989, Pat. No. 5,057,947.

[30] Foreign Application Priority Data

| Feb. 10, 1988 | [JP] | Japan | 63-29241 |
| Mar. 8, 1988 | [JP] | Japan | 63-54269 |
| Mar. 11, 1988 | [JP] | Japan | 63-58756 |
| Mar. 31, 1988 | [JP] | Japan | 63-80844 |
| May 31, 1988 | [JP] | Japan | 63-133339 |
| May 31, 1988 | [JP] | Japan | 63-133340 |
| Jun. 29, 1988 | [JP] | Japan | 63-161744 |

[51] Int. Cl.$^5$ .................. H04K 1/00; G11B 15/04
[52] U.S. Cl. .......................... 380/4; 360/60
[58] Field of Search .................. 380/4-6; 360/60, 27

[56] References Cited

U.S. PATENT DOCUMENTS

| 4,924,328 | 5/1990 | Endoh et al. | 360/60 |
| 4,945,563 | 7/1990 | Horton et al. | 380/5 |
| 5,050,011 | 9/1991 | Endoh | 360/60 |
| 5,057,947 | 10/1991 | Shimada | 360/60 |

FOREIGN PATENT DOCUMENTS

| 536261 | 5/1982 | Australia. |
| 0224929 | 6/1987 | European Pat. Off.. |
| 0297242 | 1/1989 | European Pat. Off.. |
| 02293 | 5/1985 | World Int. Prop. O.. |

Primary Examiner—Salvatore Cangialosi
Attorney, Agent, or Firm—Lowe, Price, LeBlanc & Becker

[57] ABSTRACT

A composite digital signal received by a recording and reproducing apparatus includes a digital information signal and a control signal. The control signal represents a number of digital copy generation of the associated information signal. The information signal of the received digital composite signal is recorded into recording medium. The information signal is reproduced from the recording medium. During the reproduction of the information signal, a new control signal is generated which represents a number equal to one plus the number represented by the control signal of the received composite digital signal. The new control signal and the reproduced information signal are combined into a new composite digital signal. The new composite digital signal is outputted. A check is made as to whether or not the number represented by the control signal of the received composite digital signal is equal to a predetermined number. When the number represented by the control signal of the received composite digital signal is equal to the predetermined number, the recording of the information signal of the received composite digital signal is inhibited.

4 Claims, 5 Drawing Sheets

FIG. 1(a)
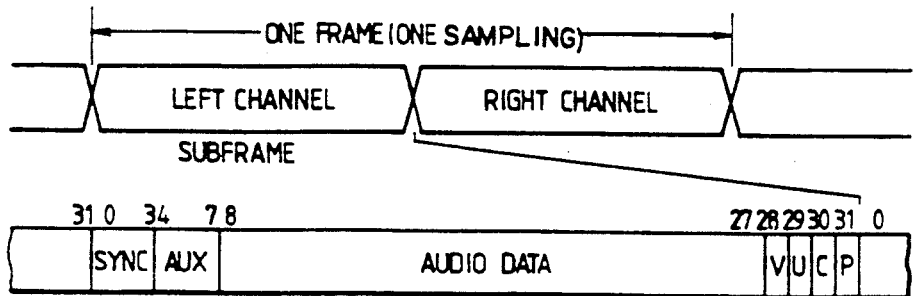
FIG. 1(b)
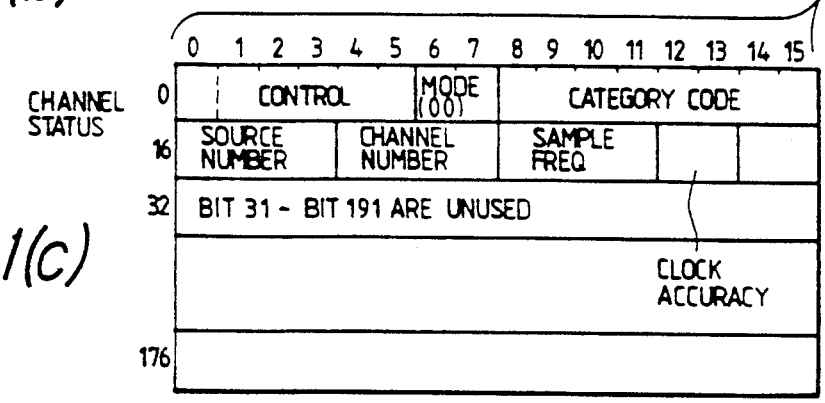
FIG. 1(c)
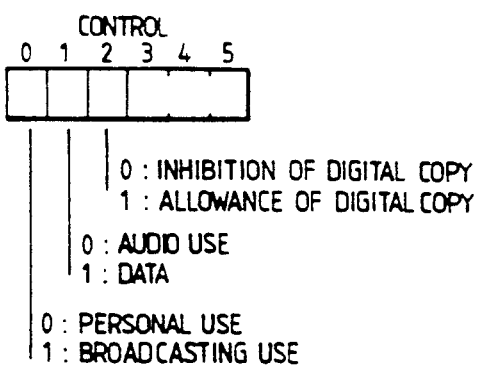
FIG. 1(d)
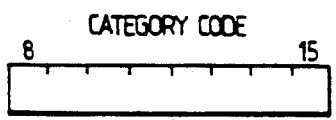
FIG. 1(e)

FIG. 2(a)
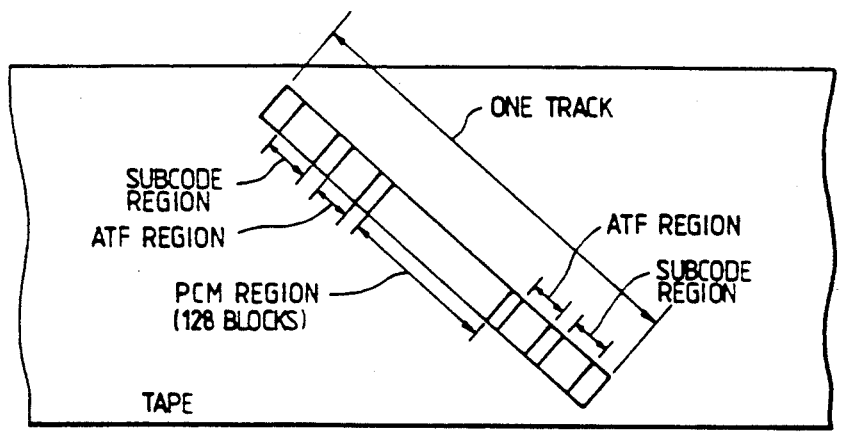
FIG. 2(b)
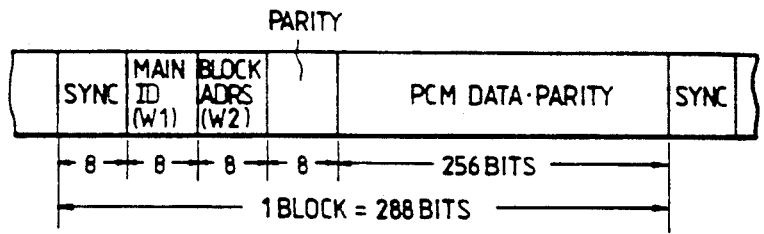
FIG. 2(c)
| MAIN ID (W1) | | | BLOCK ADRS (W2) | | | | |
|---|---|---|---|---|---|---|---|
| FMT ID | ID 1 | FRAME ADRS | 0 | X X X X | 0 | 0 | 0 |
| OPTIONAL CODE | | | 0 | ↑ | 0 | 0 | 1 |
| ID 2 | ID 3 | FRAME ADRS | 0 | ↑ | 0 | 1 | 0 |
| OPTIONAL CODE | | | 0 | ↑ | 0 | 1 | 1 |
| ID 4 | ID 5 | FRAME ADRS | 0 | ↑ | 1 | 0 | 0 |
| OPTIONAL CODE | | | 0 | ↑ | 1 | 0 | 1 |
| ID 6 | ID 7 | FRAME ADRS | 0 | ↑ | 1 | 1 | 0 |
| OPTIONAL CODE | | | 0 | ↑ | 1 | 1 | 1 |
FIG. 2(d)
FMT ID    0 0 : AUDIO USE
ID 6    0 0 : ALLOWANCE OF DIGITAL COPY
       1 0 : INHIBITION OF DIGITAL COPY
     01, 11 : ALLOWANCE OF DIGITAL COPY

RECORDING AND REPRODUCING APPARATUS WITH LIMITED DIGITAL COPYING

This application is a division of patent application Ser. No. 07/633,898 filed Dec. 26, 1990 which is a divisional application of Ser. No. 07/307,446 filed on Feb. 8, 1989 now U.S. Pat. No. 5,057,947.

BACKGROUND OF THE INVENTION

This invention relates to a recording and reproducing apparatus, such as a digital audio tape recorder referred to as a DAT.

Conventional DAT systems generally have problems in direct recording of digital audio signals. Such direct recording is referred to as a digital copying process. From the standpoint of copyright, it is desirable to limit the number of generations of copied digital audio information. In some cases, it is desired that the limitation on the digital copying process is flexible.

SUMMARY OF THE INVENTION

It is an object of this invention to provide a recording and reproducing apparatus which can suitably limit a digital copying process.

In a recording and reproducing apparatus according to an aspect of this invention, a received composite digital signal includes a digital information signal and a control signal. The control signal includes a generation number representing the digital copy generation of the associated information signal. The information signal of the received digital composite signal is recorded into recording medium. The information signal is reproduced from the recording medium. During the reproduction of the information signal, a new control signal is generated which represents a generation number equal to one plus the generation number represented by the control signal of the received composite digital signal. The new control signal and the reproduced information signal are combined into a new composite digital signal. The new composite digital signal is outputted. A check is made as to whether or not the generation number represented by the control signal of the received composite digital signal is equal to a predetermined number. When the number represented by the control signal of the received composite digital signal is equal to the predetermined number, the recording of the information signal of the received composite digital signal is inhibited.

BRIEF DESCRIPTION OF THE DRAWINGS

FIGS. 1a)-1(e) are diagrams showing the format of a digital audio signal used in a DAT system.

FIGS. 2(a)-2(d) are diagrams showing a recording format used in a DAT system.

DESCRIPTION OF THE FIRST PREFERRED EMBODIMENT

Figure 3:
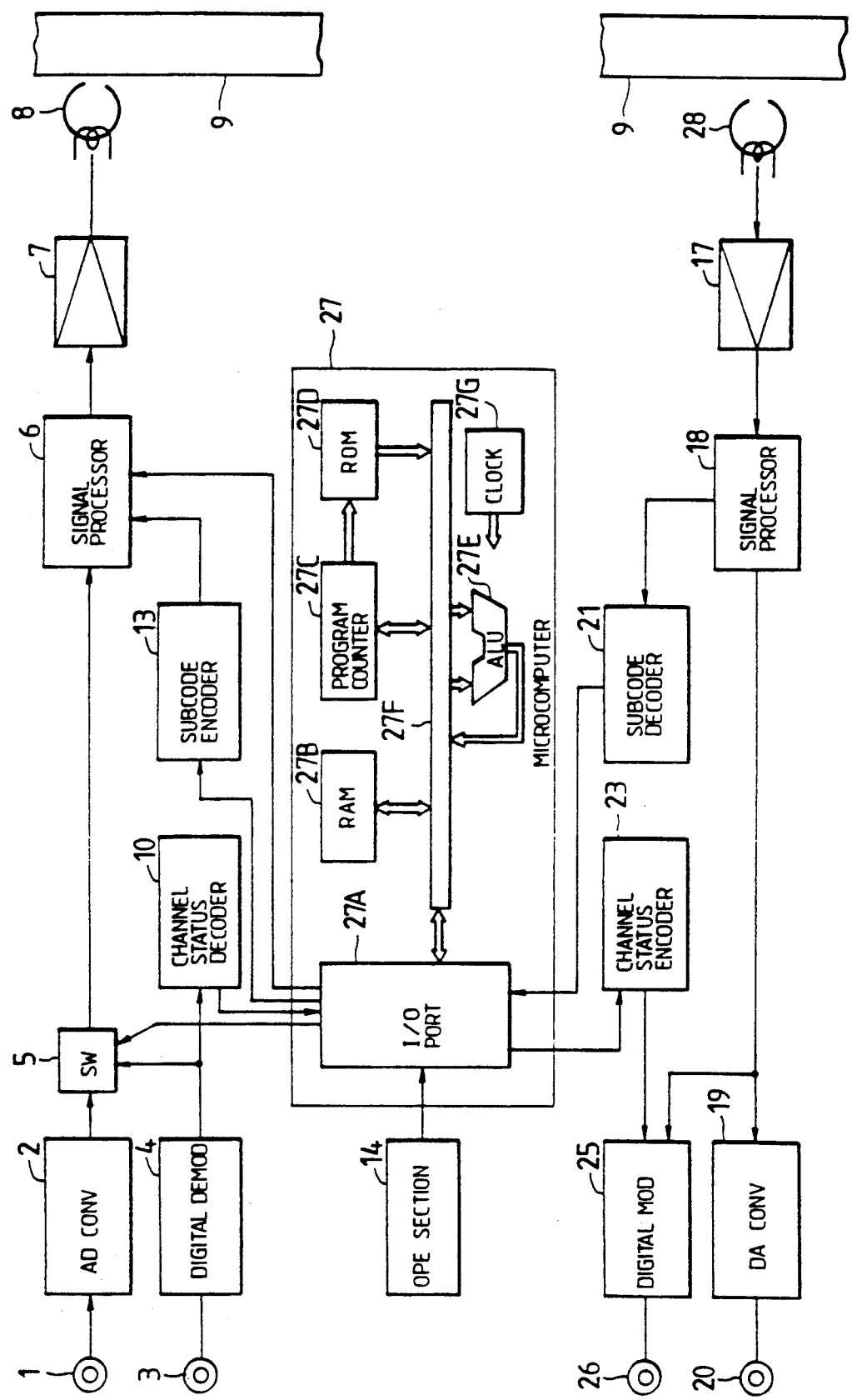
FIG. 3 is a block diagram of a DAT system according to a first embodiment of this invention.

FIG. 1 shows the format of a digital audio signal used in a DAT system according to a first embodiment of this invention.

It should be noted that a signal format and a recording format in the first embodiment of this invention are basically similar to a conventional DAT signal format and a conventional DAT recording format but differ therefrom in some points which will be described later.

As shown in FIG. 1(a), during a period of sampling of an analog signal, a pair of left-channel and right-channel subframes of a digital audio signal are formed. As shown in FIG. 1(b), each of the subframes has 32 time slots or sequential bits numbered from "0" to "31". Specifically, each subframe includes a 4-bit sync signal, 4-bit auxiliary data, 20-bit audio data, a validity flag sync signal, "V", a user data "U", a channel status "C", and a parity bit "P".

A channel status will be taken as an example. As shown in FIG. 1(c), the bits "C" of 192 successive subframes form a channel status block having 192 bits numbered from "0" to "191". In the channel status block, bit "0" to bit "5" are control bits representing a use and also representing whether or not a digital copy is allowable. In the control bits, as shown in FIG. 1(d), the bit "2" which corresponds to the third bit of the channel status represents whether or not a digital copy is allowable. Specifically, the bit "2" equal to logic "1" represents that a digital copy is allowable. The bit "2" equal to logic "0" represents that a digital copy is inhibited.

In the channel status block, bit "8" to bit "15" form a category code. As shown in FIG. 1(e), the category code generally represents a type of an apparatus from which the related digital audio signal is outputted. As will be made clear hereinafter, bit "14" of the category code is used to control a copying process. It should be noted that, in conventional systems, bit "14" of a category code is unused and is constantly logic "0".

FIG. 2 shows a recording format used in the DAT system. As shown in FIG. 2(a), one recording track formed on a magnetic tape has a PCM (pulse code modulation) region in a central portion of the magnetic tape. In the PCM region, PCM data and a main ID (identification) are recorded. The PCM data are generated by coding an audio signal. The main ID is used to reproduce the PCM data. The PCM region has 128 blocks. As shown in FIG. 2(b), one block of the PCM region has 288 bits.

As shown in FIG. 2(c), the main ID includes a format ID, and sections ID1-ID7 forming pairs recorded in alternate blocks. As shown in FIG. 2(d), the format ID equal to logic "00" represents that the DAT is an audio recorder. The section ID6 represents whether or not a digital copy is allowable. Specifically, the section ID6 equal to logic "00", "01", or "11" represents that a digital copy is allowable. The section ID6 equal to logic "10" represents that a digital copy is inhibited. It should be noted that, in conventional systems, the section ID6 equal to logic "01" or "11" is undefined in respect of a digital copy.

With reference to FIG. 3, a DAT system according to a first embodiment of this invention includes an analog input terminal 1 via which an analog audio signal is applied to an analog-to-digital (AD) converter 2. A digital audio signal is fed via a digital input terminal 3 to a digital demodulator 4. A switch 5 selects one of the digital output signals from the devices 2 and 4 and feeds the selected digital signal to a signal processor 6 in accordance with a control signal supplied from a microcomputer 27.

The signal processor 6 acts on the input digital signal through various processes such as an interleaving process, an addition of error correction codes, and an addition of an output signal from a subcode encoder 13 described hereinafter. An output digital signal from the signal processor 6 is applied via a recording amplifier 7 to a recording magnetic head 8 and is recorded into a magnetic tape 9 by the magnetic head 8. The signal processor 6 also has a function of inhibiting the recording of its output signal into the magnetic tape 9. This function is enabled and disabled in response to an output signal from the microcomputer 27. For example, the inhibition of the signal recording is performed by cutting off the application of the output signal from the signal processor 6 to the recording amplifier 7.

A channel status decoder 10 extracts a channel status (see FIG. 1(c)) from an output signal of the digital demodulator 4. The microcomputer 27 receives an output signal from the decoder 10 which represents the channel status.

A subcode encoder 13 receives an output signal from the microcomputer 27 which represents the section ID6 of the main ID. The subcode encoder 13 generates subcodes including the section ID6. The subcodes are transferred from the encoder 13 to the signal processor 6.

An operating section 14 includes a recording switch, a reproducing switch, and a selection control switch for determining which of an analog audio signal and a digital audio signal inputted via the input terminals 1 and 3 is selected. The selection control switch of the operating section 14 is changeable between an "analog" position and a "digital" position. As will be made clear hereinafter, when the selection control switch assumes the "analog" position and the "digital" position, an analog audio signal and a digital audio signal are selected respectively. Output signals from the operating section 14 are applied to the microcomputer 27.

A magnetic head 28 reproduces a digital signal from the magnetic tape 9. The reproduced digital signal is transmitted to a signal processor 18 via a reproducing amplifier 17.

The signal processor 18 acts on the reproduced digital signal through various processes such as an error correction process and a de-interleaving process. An output signal from the signal processor 18 is applied to a digital-to-analog (DA) converter 19 and a digital modulator 25. The DA converter 19 transforms the output signal from the signal processor 18 into a corresponding analog signal applied to an analog output terminal 20. The digital modulator 25 generates a digital signal in the format of FIG. 1 in accordance with the output signal from the signal processor 18 and with an output signal from a channel status encoder 23. The digital signal generated by the digital modulator 25 is applied to a digital output terminal 26.

A subcode decoder 21 extracts subcodes from an output signal of the signal processor 18. The derived subcodes include a section ID6 of a main ID. The microcomputer 27 receives an output signal from the subcode decoder 21 which represents the subcodes.

The channel status encoder 23 receives an output signal from the microcomputer 27 which represents a channel status. The device 23 encodes the output signal from the microcomputer 27.

The microcomputer 27 includes an input/output (I/O) port 27A, a random access memory (RAM) 27B, a program counter 27C, a read only memory (ROM) 27D, an arithmetic and logic unit (ALU) 27E connected via a system bus 27F. The microcomputer 27 also includes a clock generator 27G feeding clocks to the devices 27A–27E. The I/O port 27A outputs signals to the switch 5, the signal processor 6, the subcode encoder 13, and the channel status encoder 23. The I/O port 27A receives signals from the channel status decoder 10, the operating section 14, and the subcode decoder 21.

Figure 4:
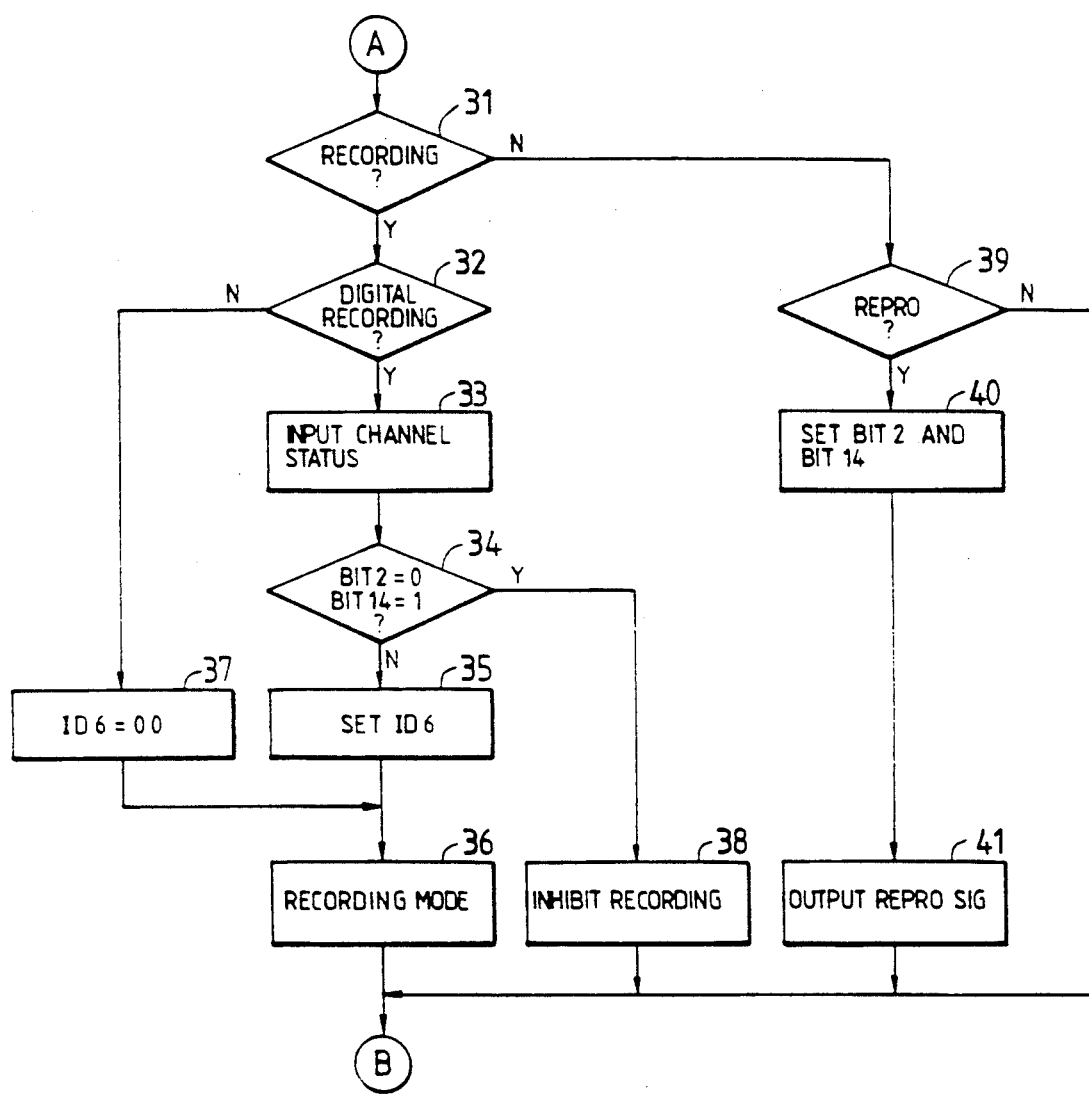
FIG. 4 is a flowchart of a portion of a program controlling the microcomputer of FIG. 3.

The microcomputer 27 operates in accordance with a program stored in the ROM 27D. FIG. 4 shows a flowchart of a portion of this program.

As shown in FIG. 4, the program advances from a point "A" to a step 31 which determines whether or not the recording switch of the operating section 14 is depressed. When the recording switch is depressed, the program advances to a step 32. When the recording switch is not depressed, the program advances to a step 39.

The step 32 determines whether or not the selection control switch of the operating section 14 is in the "digital" position. When the selection control switch is in the "digital" position, the program advances to a step 33. When the selection control switch is not in the "digital" position, that is, when the selection control switch is in the "analog" position, the program advances to a step 37.

The step 33 controls the switch 5 to select an output signal from the digital demodulator 4. Accordingly, when the selection control switch of the operating section 14 is in the "digital" position, a digital audio signal inputted via the digital input terminal 3 is selected. In addition, the step 33 derives the current logic states of bit "2" and bit "14" of the channel status by referring to an output signal from the channel status decoder 10.

A step 34 following the step 33 determines whether or not bit "2" and bit "14" of the channel status are logic "0" and logic "1" respectively. When bit "2" and bit "14" are logic "0" and logic "1" respectively, the program advances to a step 38. When bit "2" and bit "14" are not logic "0" and logic "1" respectively, that is, when bit "2" and bit "14" are logic "0" and logic "0", logic "1" and logic "0", or logic "1" and logic "1" respectively, the program advances to a step 35.

The step 38 controls the signal processor 6 to inhibit the recording of an output signal from the signal processor 6 into the magnetic tape 9. Accordingly, when bit "2" and bit "14" of the channel status are logic "0" and logic "1" respectively, the recording of the output signal from the signal processor 6 is inhibited. After the step 38, the program advances to a point "B".

The step 35 sets a section ID6 of a main ID in accordance with bit "2" and bit "14" of the channel status. Specifically, the section ID6 is set to logic "10" when both of bit "2" and bit "14" are logic "0". The section ID6 is set to logic "00" when bit "2" and bit "14" are logic "1" and logic "0" respectively. The section ID6 is set to logic "01" when both of bit "2" and bit "14" are logic "1". After the step 35, the program advances to a step 36.

The step 37 controls the switch 5 to select an output signal from the AD converter 2. Accordingly, when the selection control switch of the operating section 14 is in the "analog" position, an analog audio signal inputted via the analog input terminal 1 is selected. In addition, the step 37 sets a section ID6 of a main ID to logic "00". After the step 37, the program advances to a step 36.

The step 36 sets a recording mode by which the recording of an output signal from the signal processor 6 into the magnetic tape 9 is enabled. After the step 36, the program advances to the point "B".

The step 39 determines whether or not the reproducing switch of the operating section 14 is depressed. When the reproducing switch is depressed, the program advances to a step 40. When the reproducing switch is not depressed, the program jumps to the point "B".

The reproducing system including the magnetic head 28 is activated in response to the depression of the recording switch of the operating section 14 in a known way.

The step 40 derives the state of the section ID6 of the main ID of the reproduced signal by referring to the output signal from the subcode detector 21. In addition, the step 40 sets bit "2" and bit "14" of a new channel status in accordance with the derived section ID6. Specifically, both of new bit "2" and bit "14" are set to logic "1" when the section ID6 is logic "00". Both of new bit "2" and bit "14" are set to logic "0" when the section ID6 is logic "01". New bit "2" and bit "14" are set to logic "0" and logic "1" respectively when the section ID6 is logic "10".

A step 41 following the step 40 outputs the new channel status to the channel status encoder 23. The channel status encoder 23 generates a signal representing the new channel status in the format of FIG. 1(c) which includes new bit "2" and bit "14" given by the step 40. The digital modulator 25 combines the output signals from the signal processor 18 and the channel status encoder 23 into a digital signal in the format of FIG. 1. The digital signal generated by the digital modulator 25 is outputted via the digital output terminal 26. After the step 41, the program advances to the point "B".

General operation of the DAT system of this embodiment will be described hereinafter. When digital recording of a digital audio signal reproduced from a compact disk or a DAT software tape is required, the digital input terminal 3 is subjected to a digital audio signal. In addition, the recording switch of the operating section 14 is depressed and the selection control switch of the operating section 14 is moved to the "digital" position. Accordingly, an output signal from the digital demodulator 4 is selected and is passed to the signal processor 6 by the switch 5. In the case of a digital audio signal reproduced from a compact disk or a DAT software tape, a bit "2" of a channel status is logic "0" representing the inhibition of digital recording, and a bit "14" of the channel status is initially logic "0". Accordingly, the program of FIG. 4 advances to the step 36 through the steps 34 and 35 so that an output signal from the signal processor 6 is recorded into the magnetic tape 9 and that a digital copy of the input digital audio signal is obtained. The step 35 sets a section ID6 of a main ID to logic "10" since both of bit "2" and bit "14" of the channel status are logic "0".

In cases where a digital audio signal is required to be reproduced from a magnetic tape which is a digital copy of a compact disk or a DAT software tape, the recording switch of the operating section 14 is undepressed but the reproducing switch of the operating section 14 is depressed. Accordingly, the program of FIG. 4 advances to the step 41 through the steps 39 and 40 so that the digital audio signal is reproduced from the magnetic tape 9. The step 40 sets bit "2" and bit "14" of a new channel status to logic "0" and logic "1" respectively since the ID6 of the reproduced digital audio signal is logic "10" as understood from the previous description. Accordingly, in the output digital audio signal transmitted via the output terminal 26, bit "2" and bit "14" of the channel status are logic "0" and "1" respectively. If such a digital audio signal is subjected to a digital copying process, the steps 34 and 38 inhibit the actualization of a digital copy since bit "2" and bit "14" of the channel status of the digital audio signal are logic "0" and "1" respectively.

When recording of an analog audio signal is required, the analog input terminal 1 is subjected to an analog audio signal. In addition, the recording switch of the operating section 14 is depressed and the selection control switch of the operating section 14 is moved to the "analog" position. Accordingly, an output signal from the AD converter 2 is selected and is passed to the signal processor 6 by the switch 5. The program of FIG. 4 advances to the step 36 through the steps 32 and 37 so that an output signal from the signal processor 6 is recorded into the magnetic tape 9. The step 37 sets a section ID6 of a main ID to logic "00". The resulting magnetic tape 9 is referred to as a first-generation tape.

When a first-generation tape is subjected to a reproduction process, both of bit "2" and bit "14" of a new channel status are set to logic "1" by the step 40 of FIG. 4 since the section ID6 of the digital audio signal which is reproduced from the first-generation tape is logic "00". Accordingly, in the output digital audio signal transmitted via the digital output terminal 26, both of bit "2" and bit "14" of the channel status are logic "1". A digital copy of such a digital audio signal is allowed since both of bit "2" and bit "14" of the channel status of the digital audio signal are logic "1". During this copying process, the section ID6 is set to logic "01" by the step 35 of FIG. 4 since both of bit "2" and bit "14" of the channel status of the digital audio signal are logic "1". The magnetic tape 9 which results from this digital copy is referred to as a second-generation tape.

When a second-generation tape is subjected to a reproduction process, both of bit "2" and bit "14" of a subsequent channel status are set to logic "0" by the step 40 of FIG. 4 since the section ID6 of the digital audio signal which is reproduced from the second-generation tape is logic "01". Accordingly, in the output digital audio signal transmitted via the digital output terminal 26, both of bit "2" and bit "14" of the channel status are logic "0". A digital copy of such a digital audio signal is allowed since both of bit "2" and bit "14" of the channel status of the digital audio signal are logic "0". During this copying process, the section ID6 is set to logic "10" by the step 35 of FIG. 4 since both of bit "2" and bit "14" of the channel status of the digital audio signal are logic "0". The magnetic tape 9 which results from this digital copy is referred to as a third-generation tape.

When a third-generation tape is subjected to a reproduction process, bit "2" and bit "14" of a new channel status are set to logic "0" and logic "1" respectively by the step 40 of FIG. 4 since the section ID6 of the digital audio signal which is reproduced from the third-generation tape is logic "10". Accordingly, in the output digital audio signal transmitted via the digital output terminal 26, bit "2" and bit "14" of the channel status are logic "0" and logic "1" respectively. A digital copy of such a digital audio signal is inhibited by the functions of the steps 34 and 38 of FIG. 4 since bit "2" and bit "14" of the channel status of the digital audio signal are logic "0" and logic "1" respectively. In other words, a digital copying process producing a fourth-generation tape is inhibited.

As understood from the previous description, bit "2" and bit "14" of a channel status of a digital audio signal represent a generation number representative of the digital copy generation of an audio information part of the digital audio signal. Each time the recording and reproduction of the digital audio signal is performed, that is, each time a digital copying process is performed, the number represented by bit "2" and bit "14" of a channel status is incremented. When the number represented by bit "2" and bit "14" of a channel status reaches a predetermined number, a digital copying process will be inhibited.

DESCRIPTION OF THE SECOND PREFERRED EMBODIMENT

A second embodiment of this invention is similar to the embodiment of FIGS. 1-4 except that a program controlling a microcomputer 27 (see FIG. 3) differs from the program (see FIG. 4) of the embodiment of FIGS. 1-4.

Figure 5:
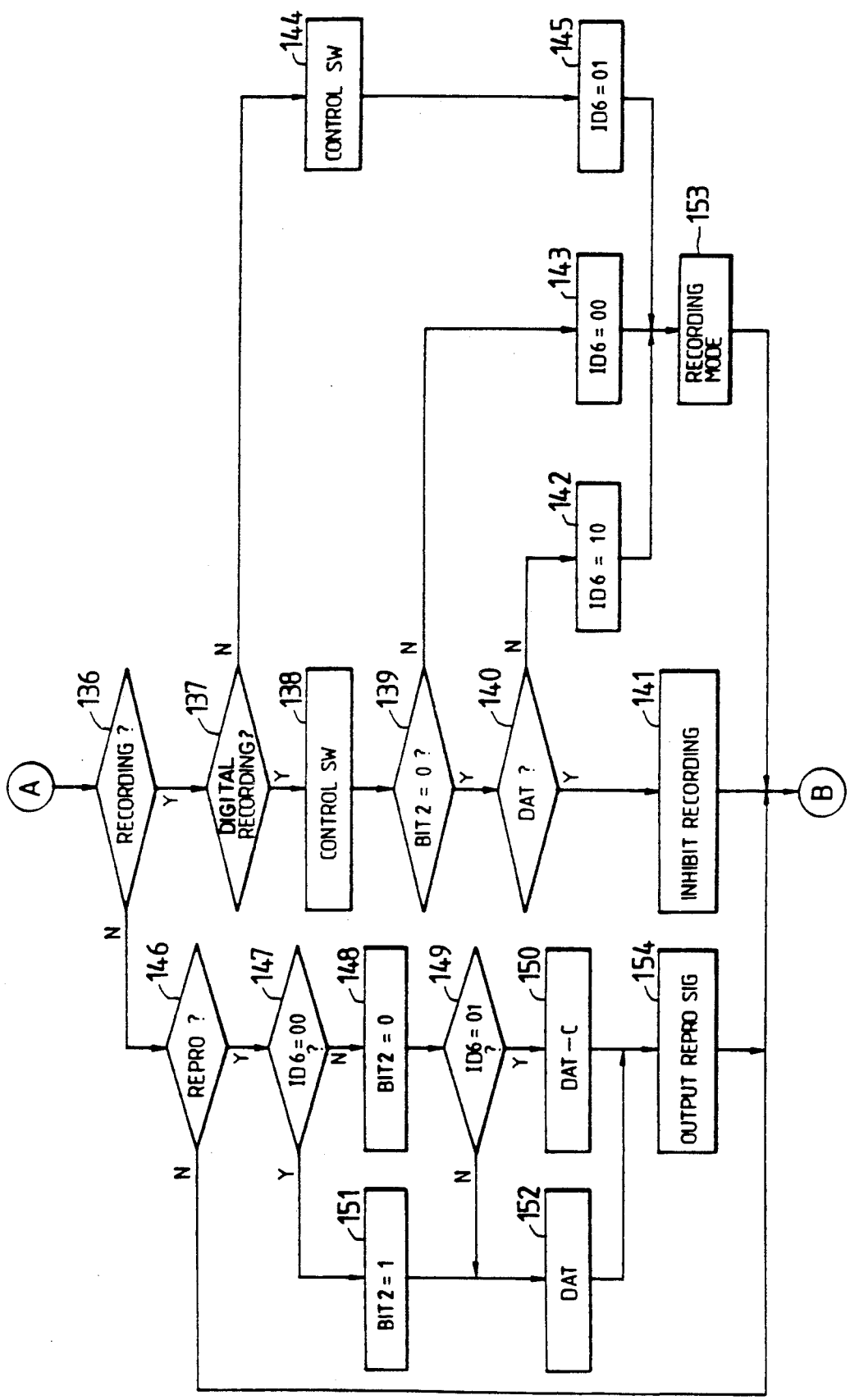
FIG. 5 is a flowchart of a portion of a program controlling a microcomputer in a second embodiment of this invention.

FIG. 5 is a flowchart of a portion of the program in the second embodiment. As shown in FIG. 5, the program advances from a point "A" to a step 136 which determines whether or not a recording switch of an operating section 14 (see FIG. 3) is depressed. When the recording switch is depressed, the program advances to a step 137. When the recording switch is not depressed, the program advances to a step 146.

The step 137 determines whether or not a selection control switch of the operating section 14 is in a "digital" position. When the selection control switch is in the "digital" position, the program advances to a step 138. When the selection control switch is not in the "digital" position, that is, when the selection control switch is in an "analog" position, the program advances to a step 144.

The step 138 controls a switch 5 (see FIG. 3) to select an output signal from a digital demodulator 4 (see FIG. 3). Accordingly, when the selection control switch of the operating section 14 is in the "digital" position, a digital audio signal inputted via a digital input terminal 3 (see FIG. 3) is selected.

A step 139 following the step 138 checks bit "2" of a channel status by referring to an output signal from a channel status decoder 10 (see FIG. 3). When the bit "2" is logic "0" which represents the inhibition of a digital copy, the program advances to a step 140. When the bit "2" is logic "1" which represents the allowance of a digital copy, the program advances to a step 143.

The step 140 checks a category code, that is, bits "8" to "15" of the channel status by referring to the output signal from the channel status decoder 10. When the category code corresponds to "DAT", that is, when the input digital audio signal is outputted from a DAT system, the program advances to a step 141. When the category code does not correspond to "DAT", the program advances to a step 142.

The step 141 controls a signal processor 6 (see FIG. 3) to inhibit the recording of an output signal from the signal processor 6 into a magnetic tape 9 (see FIG. 3). For example, the inhibition of the signal recording is performed by cutting off the application of the output signal from the signal processor 6 to a recording amplifier 7 (see FIG. 3). Accordingly, when bit "2" of the channel status is logic "0" and also the category code corresponds to "DAT", the recording of the output signal from the signal processor 6 is inhibited. After the step 141, the program advances to a point "B".

The step 144 controls the switch 5 to select an output signal from an AD converter 2 (see FIG. 3). Accordingly, when the selection control switch of the operating section 14 is in the "analog" position, an analog audio signal inputted via an analog input terminal 1 (see FIG. 3) is selected.

A step 145 following the step 144 sets a section ID6 of a main ID to logic "01". After the step 145, the program advances to a step 153.

The step 143 sets the section ID6 of the main ID to logic "00". After the step 143, the program advances to a step 153.

The step 142 sets the section ID6 of the main ID to logic "10". After the step 142, the program advances to a step 153.

In this way, the section ID6 of the main ID is set to logic "01" when an analog audio signal is selected and recorded. The section ID6 is set to logic "00" in the case of a digital copy where bit "2" of the channel status is logic "1" which represents the allowance of the copy. The section ID6 is set to logic "10" in the case of a digital copy where the category of the channel status differs from "DAT".

The step 153 sets a recording mode by which the recording of an output signal from the signal processor 6 into the magnetic tape 9 is enabled. Accordingly, when bit "2" of the channel status is logic "1" or when the category code differs from "DAT", a digital copy is allowed. After the step 153, the program advances to the point "B".

The step 146 determines whether or not a reproducing switch of the operating section 14 is depressed. When the reproducing switch is depressed, the program advances to a step 147. When the reproducing switch is not depressed, the program jumps to the point "B".

A reproducing system including a magnetic head 28 (see FIG. 3) is activated in response to the depression of the recording switch of the operating section 14 in a known way.

The step 147 checks a section ID6 of a main ID of a reproduced digital signal by referring to an output signal from a subcode decoder 21 (see FIG. 3). When the section ID6 differs from logic "00", the program advances to a step 148. When the section ID6 is logic "00", the program advances to a step 151.

The step 148 sets bit "2" of a new channel status to logic "0" which represents the inhibition of a digital copy. After the step 148, the program advances to a step 149.

The step 151 sets bit "2" of a new channel status to logic "1" which represents the allowance of a digital copy. After the step 151, the program advances to a step 152.

The step 149 determines whether or not the section ID6 of the main ID is logic "01". When the section ID6 is logic "01", the program advances to a step 150. When the section ID6 is not logic "01", the program advances to the step 152.

The step 150 sets a category code of a new channel status to a predetermined state, for example, logic "11100000", which is named "DAT-C". The category code "DAT-C" represents that a related digital audio signal is outputted from a DAT system and that a digital copy is allowable regardless of the state of bit "2" of a channel status of the digital audio signal. After the step 150, the program advances to a step 154.

The step 152 sets a category code of a new channel status to logic "11000000" corresponding to "DAT".

After the step 152, the program advances to the step 154.

The step 154 outputs the channel status to a channel status encoder 23 (see FIG. 3). The channel status encoder 23 generates a signal representing the channel status of FIG. 1(c) which includes bit "2" given by the step 148 or 151 and also which includes the category code given by the step 150 or 152. A digital modulator 25 (see FIG. 3) generates a digital signal of the format of FIG. 1 in accordance with the output signals from a signal processor 18 (see FIG. 3) and the channel status encoder 23. The digital signal generated by the digital modulator 25 is outputted via a digital output terminal 26 (see FIG. 3). After the step 154, the program advances to the point "B".

General operation of the second embodiment will be described hereinafter. In a digital audio signal reproduced from a compact disk, bit "2" of a channel status is logic "0" representing the inhibition of digital recording. When such a digital audio signal is required to be digitally copied, the digital input terminal 3 is subjected to the digital audio signal. In addition, the recording switch of the operating section 14 is depressed and the selection control switch of the operating section 14 is moved to the "digital" position. Accordingly, an output signal from the digital demodulator 4 is selected and is passed to the signal processor 6 by the switch 5. Since bit "2" of the channel status is logic "0", the program of FIG. 5 advances from the step 139 to the step 140. In the case of a digital audio signal reproduced from a compact disk, a category code of a channel status is logic "10000000" corresponding to "CD" as shown in FIG. 1(e). Accordingly, the category code differs from "DAT" so that the program of FIG. 5 advances from the step 140 to the step 153 via the step 142. As a result, a digital copy is performed although bit "2" of the channel status represents the inhibition of a digital copy. The step 142 sets the section ID6 of the main ID to logic "10".

In cases where a digital audio signal is required to be reproduced from a magnetic tape which is a digital copy of a compact disk, the recording switch of the operating section 14 is undepressed but the reproducing switch of the operating section 14 is depressed. Accordingly, the program of FIG. 5 advances to the step 147 through the steps 136 and 146. Since the section ID6 is logic "10" as understood from the previous description, the program of FIG. 5 further advances to the step 154 through the steps 148, 149, and 152 so that the digital audio signal is reproduced from the magnetic tape 9. The step 148 sets bit "2" of a new channel status to logic "0" representing the inhibition of a digital copy. The step 152 sets the category code of the channel status to logic "11000000" corresponding to "DAT". Accordingly, in the output digital audio signal transmitted via the digital output terminal 26, bit "2" of the channel status is logic "0" and the category code of the channel status corresponds to "DAT". If such a digital audio signal is subjected to a digital copying process, the steps 139, 140, and 141 of the program of FIG. 5 inhibit the actualization of a digital copy since bit "2" of the channel status is logic "0" and since the category code of the channel status corresponds to "DAT".

In a digital audio signal outputted from a broadcasting satellite tuner, bit "2" of a channel status is logic "1" representing the allowance of a digital copy. When such a digital audio signal is required to be digitally copied, the digital input terminal 3 is subjected to the digital audio signal. In addition, the recording switch of the operating section 14 is depressed and the selection control switch of the operating section 14 is moved to the "digital" position. Accordingly, an output signal from the digital demodulator 4 is selected and is passed to the signal processor 6 by the switch 5. Since bit "2" of the channel status is logic "1", the program of FIG. 5 advances from the step 139 to the step 153 via the step 143. As a result, a digital copy is obtained. The step 143 sets the section ID6 of the main ID to logic "00".

In cases where a digital audio signal whose section ID6 is logic "00" is required to be reproduced from a magnetic tape, the recording switch of the operating section 14 is undepressed but the reproducing switch of the operating section 14 is depressed. Accordingly, the program of FIG. 5 advances to the step 147 through the steps 136 and 146. Since the section ID6 is logic "00", the program of FIG. 5 further advances to the step 154 through the steps 151 and 152 so that the digital audio signal is reproduced from the magnetic tape 9. The step 151 sets bit "2" of a new channel status to logic "1". The step 152 sets a category code of the new channel status to logic "11000000" corresponding to "DAT". Accordingly, in the output digital audio signal transmitted via the digital output terminal 26, bit "2" of the channel status is logic "1" and the category code of the channel status corresponds to "DAT". If such a digital audio signal is subjected to a digital copying process, the steps 139 and 153 of the program of FIG. 5 actualize a digital copy since bit "2" of the channel status is logic "1". In this way, a digital copy of such a digital audio signal is allowed repetitively over many generations.

When recording of an analog audio signal is required, the analog input terminal 1 is subjected to an analog audio signal. In addition, the recording switch of the operating section 14 is depressed and the selection control switch of the operating section 14 is moved to the "analog" position. Accordingly, an output signal from the AD converter 2 is selected and is passed to the signal processor 6 by the switch 5. The program of FIG. 5 advances to the step 153 through the steps 144 and 145 so that an output signal from the signal processor 6 is recorded into the magnetic tape 9. The step 145 sets a section ID6 of a main ID to logic "01". The resulting magnetic tape 9 is referred to as a first-generation tape.

When a first-generation tape is subjected to a reproduction process, the recording switch of the operating section 14 is undepressed but the reproducing switch of the operating section 14 is depressed. Accordingly, the program of FIG. 5 advances to the step 147 through the steps 136 and 146. Since the section ID6 is logic "01", the program of FIG. 5 further advances to the step 154 through the steps 148–150 so that the digital audio signal is reproduced from the magnetic tape 9. The step 148 sets bit "2" of a new channel status to logic "0" which represents the inhibition of a digital copy. The step 150 sets a category code of the new channel status to "DAT-C". Accordingly, in the output digital audio signal transmitted via the digital output terminal 26, bit "2" of the channel status is logic "0" and the category code of the channel status corresponds to "DAT-C". A digital copy of such a digital audio signal is allowed since the category code of the channel status differs from "DAT" and thus the program of FIG. 5 advances to the step 153 via the steps 140 and 142. The magnetic tape 9 which results from this digital copy is referred to as a second-generation tape. During the copying process which produces a second-generation tape, the step 142 of FIG. 5 sets the section ID6 to logic "10".

When a second-generation tape is subjected to a reproduction process, the recording switch of the operating section 14 is undepressed but the reproducing switch of the operating section 14 is depressed. Accordingly, the program of FIG. 5 advances to the step 147 through the steps 136 and 146. Since the section ID6 is logic "10", the program of FIG. 5 further advances to the step 154 through the steps 148, 149, and 152 so that the digital audio signal is reproduced from the magnetic tape 9. The step 148 sets bit "2" of a new channel status to logic "0" which represents the inhibition of a digital copy. The step 152 sets a category code of the new channel status to logic "11000000" corresponding to "DAT". Accordingly, in the output digital audio signal transmitted via the digital output terminal 26, bit "2" of the channel status is logic "0" and the category code of the channel status corresponds to "DAT". A digital copy of such a digital audio signal is inhibited since bit "2" of the channel status is logic "0" and the category code of the channel status corresponds to "DAT" so that the program of FIG. 5 advances to the step 141 via the steps 139 and 140. In other words, a digital copying process producing a third-generation tape is inhibited.

What is claimed is:

1. A transmission system comprising:
means for generating first and second generation-information, wherein said generating means updates a generation number of the first generation-information when a copy is made, and wherein, when said generation number reaches a predetermined number, said generating means includes data in the second generation-information for inhibiting making of a copy;
means for representing the generation information by a plurality of bits; and
means for transmitting the generation information.

2. A transmission system comprising:
means for generating first, second and third generation-information, wherein said generating means retains unchanged a generation number of the first generation-information when a copy is made, and wherein, when said generating means updates a generation number of the second generation-information when a copy is made, and wherein, when said generation number reaches a predetermined number, said generating means includes data in the third generation-information for inhibiting making of a copy;
means for representing the generation information by a plurality of bits; and
means for transmitting the generation information.

3. A transmission system comprising:
means for generating information of generation;
means for representing the generation information by a plurality of bits including a copy inhibition bit of a digital audio interface; and
means for transmitting the generation information.

4. A transmission system comprising:
means for generating information of generation;
means for representing the generation information by a combination of a copy inhibition bit and a category code of a digital audio interface; and
means for transmitting the generation information.

* * * * *